(12) United States Patent
Kokubu et al.

(10) Patent No.: US 7,028,980 B2
(45) Date of Patent: Apr. 18, 2006

(54) SOLENOID DRIVING DEVICE AND SOLENOID VALVE

(75) Inventors: Takahiro Kokubu, Aichi-ken (JP); Shunpei Sasago, Aichi-ken (JP)

(73) Assignee: Aisin Aw Co., Ltd., Aichi (JP)

( * ) Notice: Subject to any disclaimer, the term of this patent is extended or adjusted under 35 U.S.C. 154(b) by 0 days.

(21) Appl. No.: 10/930,960

(22) Filed: Sep. 1, 2004

(65) Prior Publication Data
US 2005/0051748 A1 Mar. 10, 2005

(30) Foreign Application Priority Data
Sep. 4, 2003 (JP) .............................. 2003-312737

(51) Int. Cl.
*F16K 31/02* (2006.01)
(52) U.S. Cl. .................. 251/129.15; 335/261; 335/251
(58) Field of Classification Search ........... 251/129.15; 335/250, 251, 255, 261
See application file for complete search history.

(56) References Cited

U.S. PATENT DOCUMENTS 3,851,285 A * 11/1974 Rothfuss et al. ............ 335/262
6,547,215 B1 * 4/2003 Matsusaka et al. ..... 251/129.15
2002/0101314 A1 8/2002 Oishi et al.
2003/0116739 A1 6/2003 Murao et al.

FOREIGN PATENT DOCUMENTS

| EP | 0 148 018 A2 | 7/1985 |
| JP | 2003-134781 | 5/2003 |
| JP | 2003-134781 A | 5/2003 |

* cited by examiner

*Primary Examiner*—David J. Walczak
*Assistant Examiner*—Andrew Rost
(74) *Attorney, Agent, or Firm*—Sughrue Mion, PLLC

(57) ABSTRACT

A solenoid driving device includes a coil formed by winding a coil wire on a bobbin formed of a non-magnetic material, end portions formed of a magnetic material which are disposed adjacent to both ends of the coil, a yoke formed of a magnetic material which is disposed encompassing the coil and the end portions, and a plunger disposed slidably in a hollow portion formed within the bobbin and end portions. The plunger includes a base formed of a magnetic material, a first layer formed of a non-magnetic material, and a second layer formed of a non-magnetic material having a friction coefficient smaller than that of the first layer. This allows magnetism to be severed between the plunger and end portions.

5 Claims, 3 Drawing Sheets

SOLENOID DRIVING DEVICE AND SOLENOID VALVE

CROSS-REFERENCE TO RELATED APPLICATIONS

This application claims the benefit of Japanese Patent Application No. 2003-312737 filed on Sep. 4, 2003, in the Japan Patent Office, the disclosure of which is incorporated herein in its entirety by reference.

BACKGROUND OF THE INVENTION

1. Field of the Invention

The present invention relates to a solenoid driving device and a solenoid valve.

2. Description of the Related Art

Conventionally, for example, various types of solenoid valves may be disposed in a hydraulic circuit of an automatic transmission. Each of the solenoid valves may have a solenoid unit made up of a solenoid driving device and a valve unit. The valve unit may be operated by supplying electric current to a coil of the solenoid unit, thereby opening and closing the pneumatic paths, adjusting the flow of oil, and regulating the oil pressure.

Next, a solenoid valve, using as an example a linear solenoid valve, will now be described. FIG. 2 is a cross-sectional view of a conventional linear solenoid valve. In the drawing, reference numeral 11 denotes a solenoid unit, and reference numeral 12 denotes a regulator valve unit made up of a valve unit operated by driving the solenoid unit 11. The solenoid unit 11 comprises a coil assembly 13, a plunger 14 which is disposed so as to advance toward and retreat from the coil assembly 13 (i.e., movement in the horizontal direction in the drawing), and a yoke 20 disposed so as to enclose the coil assembly 13. Also, the coil assembly 13 has a coil 17 formed by winding a coil wire 16 on a bobbin 15, end portions 18 and 19 disposed on both ends of the coil 17, and a terminal 21 for supplying electric current to the coil 17, wherein the bobbin 15 and end portions 18 and 19 are integrally assembled by welding, brazing, sintered bonding, adhesion, or the like.

A thick flange portion 28 having a tapered shape on the inner side thereof is formed on the regulator valve 12 side of the bobbin 15. A tapered edge portion 31 protrudes backwards (toward the right in the drawing) from near the inner circumference edge of the end portion 19 so as to correspond to the inner circumference face of the flange portion 28.

The coil assembly 13 is formed cylindrically except for the terminal 21 portion, with a hollow portion 22, having a constant diameter in the axial direction, formed within the coil assembly (within the bobbin 15 and end portions 18 and 19) and the plunger 14 slideably fit into the hollow portion 22. The plunger 14 has a uniform diameter and is longer than the coil 17 in the axial direction.

The rear end (the right end in the drawing) of the spool 26 of the regulator valve 12 is brought into contact with the center of the front edge face (the left end in the drawing) S1 of the plunger 14, and a contact portion 27 with a spherical shape having a predetermined height is integrally formed on the edge face at the side away from the regulator valve 12, i.e., the rear edge face (the right end in the drawing) S2.

The bobbin 15 is formed of a non-magnetic member, and, upon electric current being supplied to the coil 17 at the solenoid unit 11, a magnetic flux is generated so that a magnetic path is formed from the yoke 20 through the end portion 18, plunger 14 and end unit 19 and back to the yoke 20, whereby a force S is formed between the edge portion 31 and the plunger 14 in the magnetic path.

The force generated by coil 17 then acts on the plunger 14 with a predetermined force, providing the plunger 14 with thrust. Consequently, the thrust is transmitted to the spool 26, the regulator valve 12 is operated, and the oil pressure is regulated.

When thrust is generated at the plunger 14 upon electric current being supplied to the coil wire 16, thereby advancing or retracting the plunger 14 within the hollow portion 22, friction is generated between the outer face of the plunger 14 and the inner face of the coil assembly 13 because the plunger 14 is supported by the coil assembly 13 when it is fit into the hollow portion 22. Accordingly, the outer face of the plunger 14 is processed so as to form an outer layer with a small friction coefficient μ. Also, the outer layer is formed with a non-magnetic material such that fine foreign matter, such as iron powder or the like, does not intrude between the outer face of the plunger 14 and the inner face of the coil assembly 13 (e.g., see Japanese Unexamined Patent Application Publication No. 2003-134781).

However, with conventional linear solenoid valves, there is the need to use fluororesin (PTFE: PolyTetra Fluoro Ethylene), molybdenum disulfide, amorphous carbon (DLC), or the like as a non-magnetic member having a small friction coefficient μ. Therefore, there is a limit as to how thick the film can be formed for the outer layer.

Accordingly, it is difficult to sufficiently sever the magnetism between the plunger 14 and end portions 18 and 19, therefore, the force against the plunger 14 in the radial direction (side force) cannot be sufficiently prevented.

In this case, the plunger 14 does not slide well through the coil assembly 13, therefore, the plunger 14 cannot advance and retreat smoothly, oil pressure cannot be accurately regulated with the regulator valve 12, and consequently, the performance of the linear solenoid valve deteriorates.

SUMMARY OF THE INVENTION

Accordingly, it is an object of the present invention to solve the above and other problems of the aforementioned conventional linear solenoid valve, and to provide a solenoid driving device and solenoid valve capable of smoothly advancing and retreating the plunger. Thus, the performance of the solenoid valve is improved.

To this end, according to a first aspect of the preset invention, a solenoid driving device comprises: a coil formed by winding a coil wire on a bobbin formed of a non-magnetic material; end portions formed of a magnetic material which are disposed adjacent to both ends of the coil; a yoke formed of a magnetic material which is disposed encompassing the coil and the end portions; and a plunger disposed slidably in a hollow portion formed within the bobbin and end portions in the radial direction; the plunger comprising a base formed of a magnetic material, a first layer formed of a non-magnetic material which is disposed outside of the base in the radial direction, and a second layer that is formed of a non-magnetic material having a friction coefficient smaller than that of the first layer and disposed outside of the first layer in the radial direction.

The first layer may be formed thicker than the second layer and may be formed by plating processing. Also, the second layer may be formed of any one of fluororesin, molybdenum disulfide, or amorphous carbon.

According to a second aspect of the preset invention, a solenoid valve comprises: a coil formed by winding a coil wire on a bobbin formed of a non-magnetic material; end portions formed of a magnetic material which are disposed adjacent to both ends of the coil; a yoke formed of a magnetic material which is disposed encompassing the coil and the end portions; a plunger disposed slidably in a hollow portion formed within the bobbin and end portions in the radial direction; a valve main unit integrally assembled with the yoke; and a spool disposed within the valve main unit so as to be capable of advancing and retreating within the valve main unit with one end in contact with the plunger; the plunger comprising a base formed of a magnetic material, a first layer formed of a non-magnetic material which is disposed outside of the base in the radial direction, and a second layer that is formed of a non-magnetic material having a friction coefficient smaller than that of the first layer and disposed outside of the first layer in the radial direction.

Thus, according to the configuration described above, the plunger slides easily between the bobbin and end portions and can be smoothly advanced and retreated, thereby improving the performance of the solenoid valve.

BRIEF DESCRIPTION OF THE DRAWINGS

The above and other features of the present invention will be readily apparent by describing, in detail, exemplary embodiments thereof with reference to the accompanying drawings, in which.

DESCRIPTION OF ILLUSTRATIVE, NON-LIMITING EMBODIMENTS OF THE INVENTION

An illustrative, non-limiting embodiment of present invention will be described in detail with reference to the accompanying drawings. Here, a linear solenoid valve will be described as an example of the solenoid valve.

Figure 1:
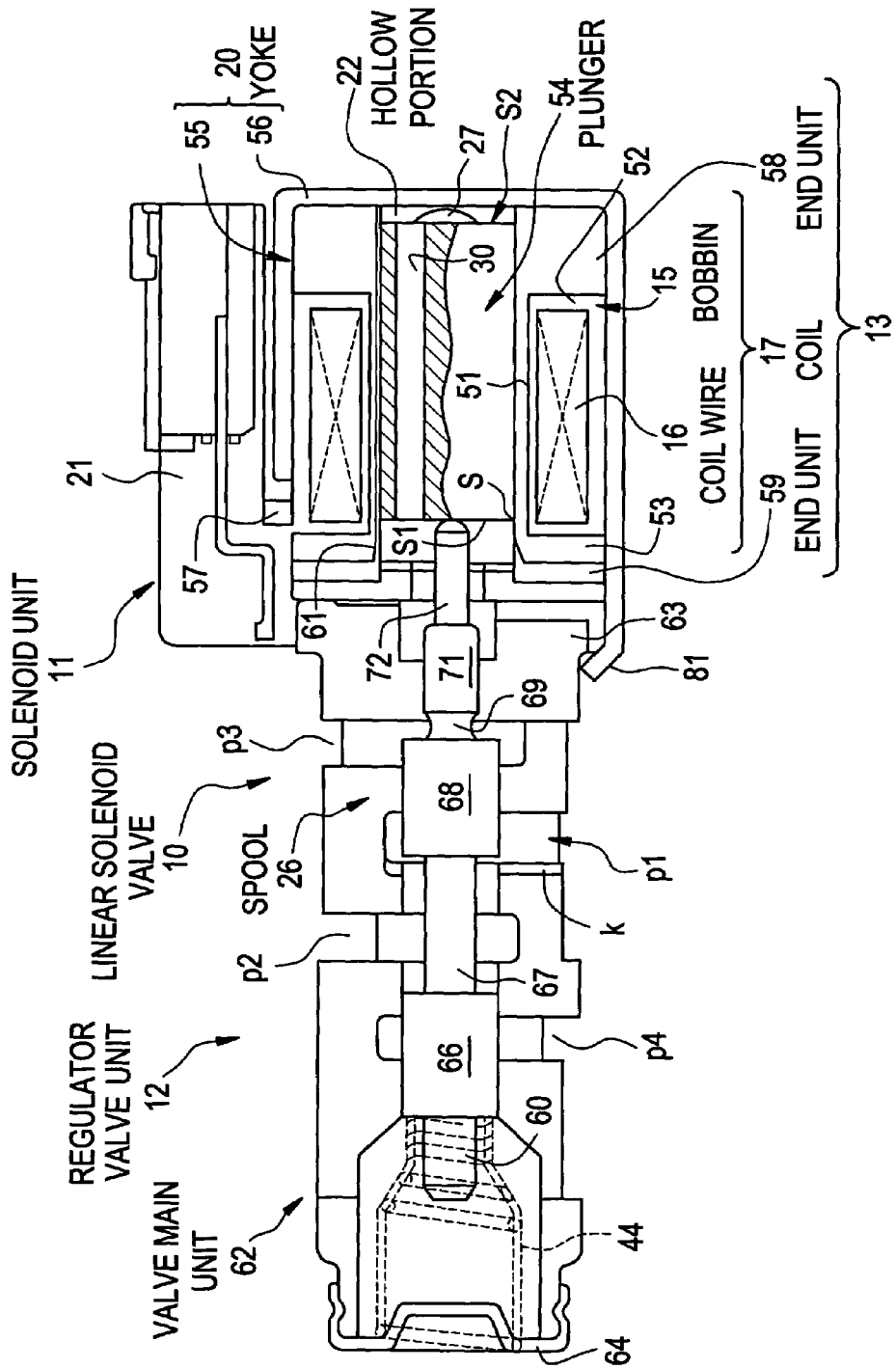
FIG. 1 is a cross-sectional view of a linear solenoid valve according to an embodiment of the present invention.
Figure 2:
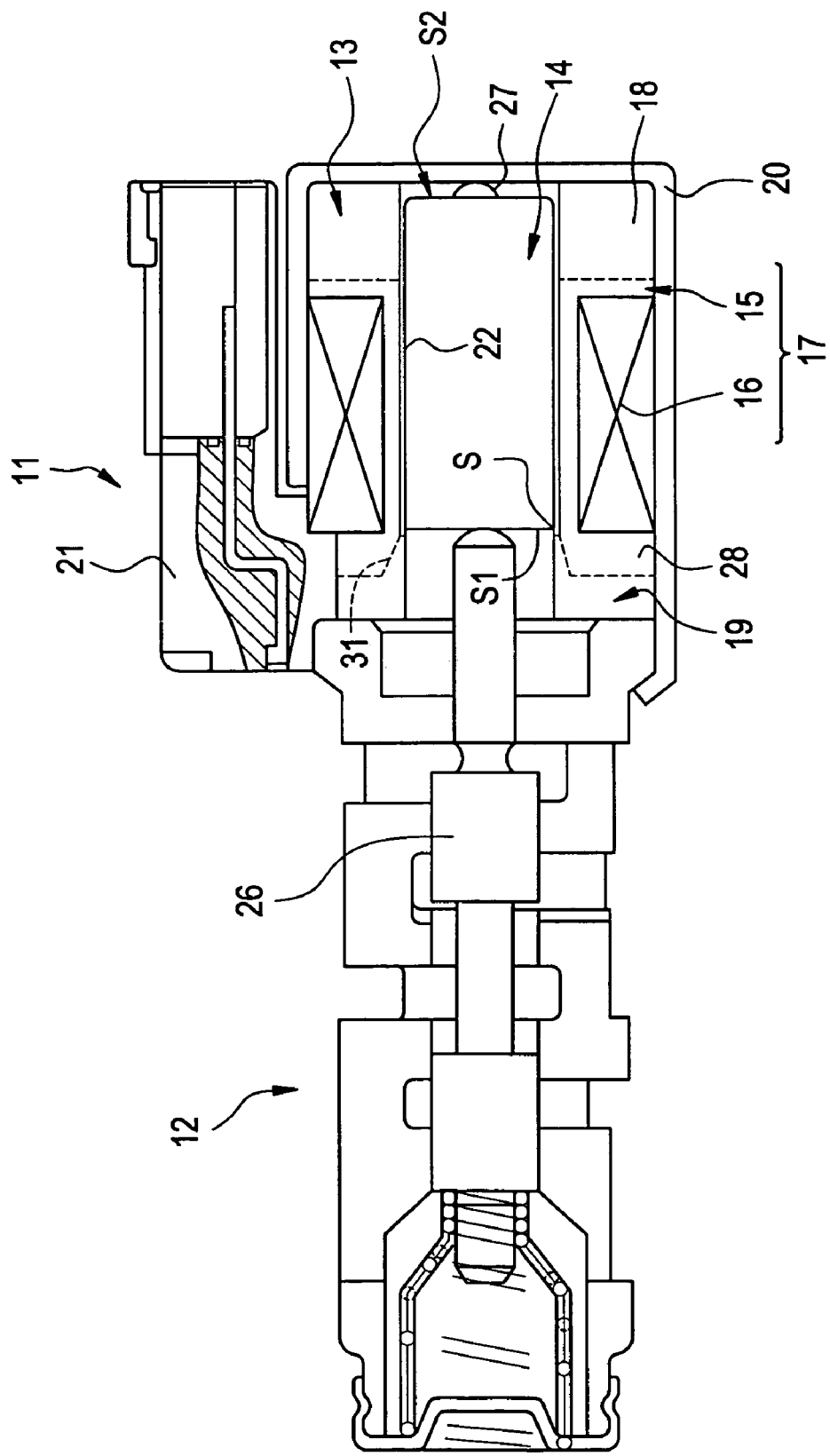
FIG. 2 is a cross-sectional view of a conventional linear solenoid valve.
Figure 3:
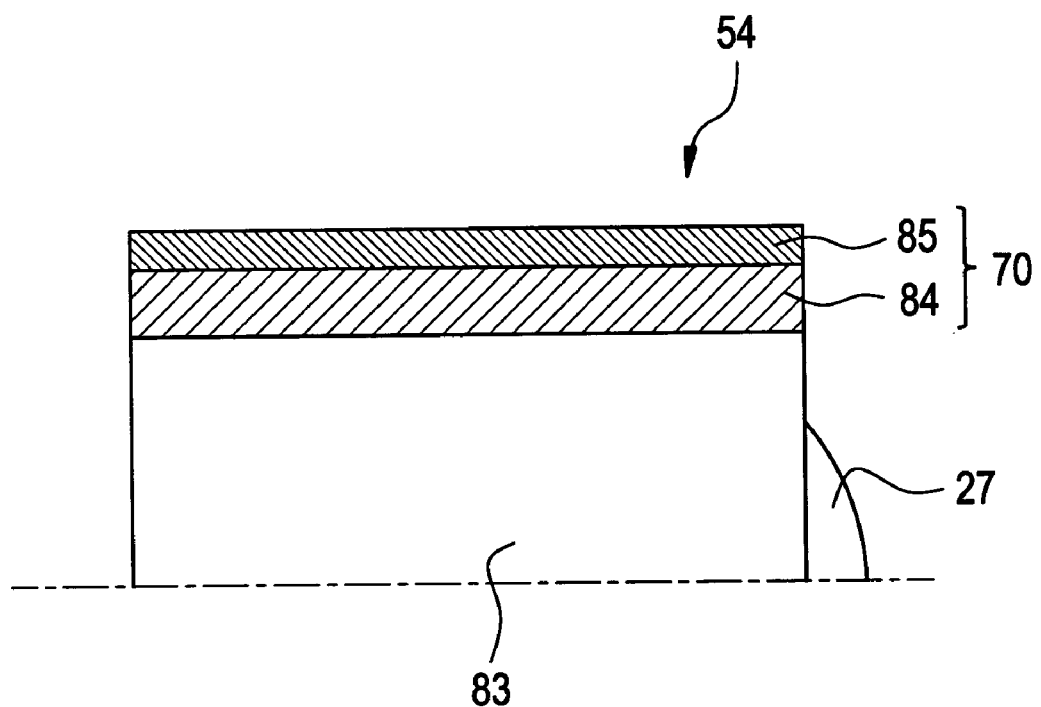
FIG. 3 is a cross-sectional view illustrating principal components of a plunger according to the present embodiment.

FIG. 1 is a cross-sectional view of a linear solenoid valve according to an embodiment of the present invention, and FIG. 3 is a cross-sectional diagram illustrating principal components of a plunger according to an embodiment of the present invention.

In the drawings, reference numeral 10 denotes a linear solenoid value. The linear solenoid valve 10 is connected to a line pressure oil path and the like of a hydraulic circuit of an automatic transmission via a modulator valve (not shown), and predetermined oil pressure generated at the modulator valve (i.e., the regulator pressure) is supplied to the linear solenoid valve 10 as input pressure. The linear solenoid valve 10 operates based on electric current and outputs oil pressure, corresponding to the electric current, to a control valve (not shown) as predetermined output pressure (pilot pressure).

Reference numeral 11 denotes a solenoid unit made up of the solenoid driving device, and reference numeral 12 denotes a regulator value unit serving as a valve unit operated by driving the solenoid unit 11, wherein the linear solenoid valve 10 is attached to an automatic transmission casing (not shown) with the solenoid unit 11 facing up and the regulator valve 12 facing down. The solenoid unit 11 comprises a coil assembly 13, a plunger 54 disposed so as to be capable of advancing and retreating (moving in the left and right directions in FIG. 1) with respect to the coil assembly 13 and a yoke 20, which is a cylindrical case encompassing the coil assembly 13.

Also, the coil assembly 13 comprises a coil 17 formed by winding a coil wire 16 on a bobbin 15, a ring-shaped end portion 58 serving as a first end yoke disposed adjacent to the rear end of the coil 17 (the right end in FIG. 1), a ring-shaped end portion 59 serving as a second end yoke disposed adjacent to the front end of the coil 17 (the left end in FIG. 1), and a terminal 21 for supplying electric current to the coil 17.

The coil assembly 13 is formed in a cylindrical shape except for the terminal 21 portion, with a hollow portion 22, having a constant diameter in the axial direction, formed within the coil assembly 13 (in the inner radial direction of the bobbin 15 and end portions 58 and 59) and the plunger 54 slidably fit into the hollow portion 22. Accordingly, the plunger 54 is supported by the coil assembly 13 when it is inserted into the hollow portion 22.

The bobbin 15 is formed of a non-magnetic material, examples of which include a non magnetic metal such as stainless steel (SUS) and synthetic resin. The bobbin 15 has a cylindrical portion 51, a ring-shaped flange portion 52 formed facing in the outwards radial direction at the rear end of the cylindrical portion 51, and a ring-shaped flange portion 53 formed facing in the outwards radial direction at the front end of the cylindrical portion 51, so as to have a cross-sectional shape of a box with one side open. The bobbin 15 and the end portions 58 and 59 are integrally assembled by welding, brazing, sintered bonding, adhesion, or the like.

The end portions 58 and 59 are formed of a magnetic material, i.e., ferromagnetic material such as electromagnetic soft iron. Electromagnetic soft iron that includes 95% or more pure iron, preferably approximately 99% or more ("approximately" meaning that 99% or more rounded off at the decimal, i.e., essentially pure iron), may be used.

The yoke 20 is formed as a cylinder having a bottom, comprising a cylindrical portion 55 and a round bottom 56, and is integrally formed by plastic metal working such as deep-drawing or cold-forging. A notch 57 is formed at a predetermined portion of the front end of the cylindrical portion 55, with the terminal 21 being attached to the coil assembly 13 via the notch 57.

The yoke 20 is formed of a magnetic material, i.e., ferromagnetic material such as a low-carbon steel with little carbon so as to facilitate plastic metal working. For example, yoke 20 may be formed with the same electromagnetic soft iron as that used in the end portions 58 and 59.

Also, a crimped portion 81 is formed at the front end of the cylindrical portion 55 of the yoke 20. When the coil assembly 13 is fit into the yoke 20 and the valve main unit 62 is set into the regulator valve 12, the crimped portion 81 and flange portion 63 formed at the rear end of the valve main unit 62 are crimped. Thus, the solenoid unit 11 and regulator valve 12 are integrally assembled.

The plunger 54 has a uniform diameter and is formed longer than the coil 17 in the axial direction. The rear end of the spool 26 of the regulator valve 12 is brought into contact with the center of the front end face (the left edge face in FIG. 1) SI of the plunger 54, and a contact portion 27 with a spherical shape having a predetermined height is integrally formed on the rear edge face (the right end in the drawing) S2. The surface of the contact portion 27 is subjected to surface processing, thereby forming an outer layer formed of a non-magnetic material.

Also, an oil channel 30 having a predetermined diameter passes through the plunger 54 in the axial direction so that the front side and the rear side of the plunger 54 communicate via the oil channel 30. Accordingly, oil flows back and forth between the front side and the rear side of the plunger 54 in the hollow portion 22 in accordance with the plunger 54 advancing and retreating.

The contact portion 27 is formed on the plunger 54 and an outer layer of non-magnetic material is formed on the surface of the contact portion 27. Therefore, the generation of a magnetic flux between the yoke 20 and contact portion 27 can be prevented in a state wherein the contact portion 27 is in contact with the yoke 20, thereby severing the magnetism.

Note that while the contact portion 27 has a spherical shape with the present embodiment, various shapes may be used, such as a round column, square column, ring, and so forth. Also, with the present embodiment, the contact portion 27 is formed on the plunger 54. However, an arrangement may be made wherein the rear edge face S2 of the plunger 54 is formed flat with the contact portion formed on the yoke 20 protruding toward the plunger 54, or contact portions may be formed on both the plunger 54 and yoke 20.

The flange portion 53 is disposed on the regulator valve 12 side and is formed thick. The inner circumference face of the flange portion 53 is formed with a tapered shape. The tapered shape is such that the inner diameter of the flange portion 53 is the greatest at the front edge of the flange portion 53, grows smaller toward the rear side, and becomes the same as the inner diameter or the cylindrical portion 51 at the rear end of the flange portion 53.

Also, an edge portion 61 having a cross-sectional triangular shape which has a tapered outer circumferential face corresponding to the inner circumferential face of the flange portion 53 is formed near the inner circumference edge of the end portion 59, so as to protrude backwards, such that the inner circumference face of the flange portion 53 and the outer circumference face of the edge portion 61 come into contact. Accordingly, the outer diameter of the edge portion 61 is the greatest at the front edge of flange portion 53, grows smaller toward the rear, and becomes equal to the inner diameter of the end portion 59. In this case, the edge portion 61 is formed tapered to a point toward the rear, so magnetic saturation is formed at the edge portion 61.

Note that with the present embodiment, the outer circumferential face of the edge portion 61 and the inner circumferential face of the flange portion 53 are tapered. However, arrangements may be made wherein the outer circumferential face and the inner circumferential face are curved in convex or concave shapes or with varying inclination angles in a single article.

The plunger 54 is formed of a ferromagnetic material similar to the end portions 58 and 59 and the yoke 20, such as electromagnetic soft iron or the like.

The outer circumferential face of the plunger 54 is subjected to surface processing, with a layer structure of multiple layers, two in the present embodiment, being formed. Accordingly, as shown in FIG. 3, the plunger 54 comprises a base 83 formed of a magnetic material (i.e., a ferromagnetic material), an intermediate layer 84 serving as a first layer formed on the outside of the base 83 in the radial direction, and an outmost layer 85 serving as a second layer formed on the outside of the intermediate layer 84 in the radial direction. Note that the intermediate layer 84 and the outmost layer 85 make up an outer layer 70.

The intermediate layer 84 is formed sufficiently thicker than the outmost layer 85, and intermediate layer 84 is formed of a non-magnetic material by, for example, plating processing. Plating processing forms a coating film such as Ni—P plating, Sn plating, Cu plating, and so forth.

On the other hand, the outmost layer 85 is a material with a friction coefficient μ smaller than that of the intermediate layer 84, and outmost layer 85 is also formed of a non-magnetic material by, for example, coating processing. An example of a material with a small friction coefficient μ is a self-lubricated material or the like. Note that in the coating processing, a coating film of fluororesin (PTFE: PolyTetra Fluoro Ethylene), molybdenum disulfide, amorphous carbon (DLC), or the like is formed. Also, the outmost layer 85 can be formed by nitriding processing (tufftride treatment or the like), chromizing, diffusion bonding processing (processing wherein a wear-resistant metal or low-resistance metal is formed on the surface by bonding), and so forth.

The regulator valve 12 comprises a valve main unit 62, a spool 26 fit into the valve main unit 62 so as to be capable of advancing and retreating, an end plate 64 snapped to the front end of the valve main unit 62 for preventing the spool 26 from falling out of the valve main unit 62, and a spring 44 serving as a pressing member for pressing the spool 26 toward the solenoid unit 11 side with a predetermined spring force, being disposed between the end plate 64 and the front end of the spool 26.

The spool 26 comprises a spring seat 60 formed at the front end to be inserted into the spring 44, a large-diameter land 66 formed behind and adjacent to the spring seat 60, a small-diameter groove 67 formed behind and adjacent to the land 66, a large-diameter land 68 formed behind and adjacent to the groove 67, a small-diameter groove 69 formed behind and adjacent to the land 68, an intermediate-diameter land 71 formed behind and adjacent to the groove 69, and a small-diameter plunger contact portion 72 formed behind and adjacent to the land 71.

The valve main unit 62 comprises an input port p1 from which input pressure supplied from the modulator valve is supplied, an output port p2 for outputting output pressure to the control valve, a closed-off feedback port p3 and a drain port p4. The feedback port p3 communicates with the output port p2 via a feedback oil channel (not shown) so that output pressure is supplied as feedback pressure which generates a pressing force corresponding to the difference in area between lands 68 and 71, thereby forcing the spool 26 forward with the pressing force. Note that a notch k is formed on the input port p1.

Accordingly, the spool 26 receives the thrust of the plunger 54, the spring force of the spring 44 and the pressing force of the feedback pressure and advances or retreats integrally with the plunger 54 when the plunger contact portion 72 is in contact with the plunger 54.

Because the plunger 54 is directly supported by the cylindrical portion 51 and end portions 58 and 59, there is no need to provide a stator core within the coil 17 in the radial direction as with conventional arrangements. Accordingly, not only can the solenoid unit 11 be reduced by that much, but also the number of windings in the coil wire can be increased, thereby increasing magnetomotive force.

Also, because the bobbin 15, intermediate layer 84 and outmost layer 85 are formed of non-magnetic material, there is no intrusion of fine foreign matter such as iron powder or the like between the outer circumferential face of the plunger 54 and the inner circumferential face of the coil assembly 13. Accordingly, the plunger 54 can be smoothly advanced and retreated.

Also, with regard to the intermediate layer 84, there is no need to use a non-magnetic material with a small friction coefficient μ such as fluororesin, molybdenum disulfide, or amorphous carbon. Accordingly, the intermediate layer 84 can be formed by Ni—P plating, Sn plating, Cu plating, or the like. By using a material having a greater friction coefficient μ than the outmost layer 85 as a non-magnetic material, the intermediate layer 84 can be easily formed with a great thickness, thereby increasing the thickness of the outer layer 70.

As a result, the magnetism can be cut off between the plunger 54 and end portions 58 and 59, thus, radial-direction force can be suppressed from being applied to the plunger 54. This improves the sliding of the plunger 54 against the coil assembly 13. Therefore, the plunger 54 can be advanced and retreated smoothly, oil pressure can be accurately regulated by the regulator valve 12, and accordingly, the performance of the linear solenoid valve 10 can be improved.

Next, the operation of the linear solenoid valve 10 of the above-described configuration will be described. At the initial position of the plunger 54, the contact portion 27 is in contact with the bottom portion 56. Upon electric current being supplied to the coil 17 via the terminal 21, a magnetic flux is generated, but because the bobbin 15 is formed of a non-magnetic material, the magnetic flux passes around the bobbin 15 and forms a magnetic path from the yoke 20 through the end portion 58, plunger 54 and end portion 59 and back to the yoke 20, thus forming a force S between the edge portion 61 and plunger 54 in the magnetic path.

Because a gap is formed between the rear edge face S2 of the plunger 54 and the yoke 20 which corresponds to the contact portion 27 formed there and also, as described above, the surface of the contact portion 27 has been processed so as to form an outer layer 70 of non-magnetic material thereupon, there is no leakage of magnetic flux from the rear edge of the plunger 54. Also, because the clearance between the inner circumference of the end portions 58 and 59 and the outer circumference of the plunger 54 is sufficiently small, the magnetic resistance of the magnetic path can be reduced.

The force generated by coil 17 then forces the plunger 54 with a predetermined force, thereby generating a thrust at the plunger 54. Consequently, the thrust is transmitted to the spool 26, along with the feedback pressure against the spring force from the spring 44, so that the regulator valve 12 is operated and the spool 26 advances (moves toward the left side in FIG. 1). In this case, the spool 26 is advanced integrally with the plunger 54 against the spring force (based on the stroke of the plunger 54), thereby controlling the position of the spool 26. Accordingly, the flow ratio of the input port p1 and drain port p4 is controlled so that the oil pressure is linearly regulated and the regulated oil pressure is output from the output port p2 as the output pressure.

Because the edge portion 61 is tapered to a point, the cross-sectional area of the magnetic path is small at the edge portion 61. Accordingly, magnetic saturation is generated in the edge portion 61 according to the value of the electric current supplied to the coil 17 (i.e., the electric current value) and the stroke of the plunger 54. Consequently, the force to stroke the plunger 54 is relatively flat at all electric current values.

Also, the plunger 54 and end portion 59 are always overlapped in the axial direction so as to ensure a predetermined magnetic flux handover portion. In the event that the cross-sectional area for magnetic flux passage is approximately the same for the plunger 54 and the yoke 20, setting the amount of overlapping of the end portion 58 with the plunger 54 so as to be equal to or greater than the cross-sectional area for magnetic flux passage, regardless of the stroke of the plunger 54, allows not only the solenoid unit 11 to be reduced in size but also the magnetic efficiency to be improved.

Cutting off the supply of electric current to the coil 17 causes the spool 26 and the plunger 54 to retreat (move toward the right direction in FIG. 1) due to the spring force. Accordingly, the contact portion 27 collides with the bottom portion 56. Because the contact portion 27 has a spherical shape and the yoke 20 is formed of a relatively soft metal such as low-carbon steel or the like and is formed by plastic metal working such as deep-drawing or cold-forging, the shock is small and the plunger 54 rapidly returns to the initial position.

Note that the present invention is by no means restricted to the exemplary embodiment described above; rather, a wide range of modifications may be made within the spirit and scope of the invention.

What is claimed is:

1. A solenoid driving device comprising:
   a coil disposed on a bobbin formed of a non-magnetic material;
   end portions formed of a magnetic material which are disposed adjacent to both ends of said coil;
   a yoke formed of a magnetic material which is disposed encompassing said coil and said end portions; and
   a plunger disposed slidably in a hollow portion formed within said bobbin and end portions in the radial direction; said plunger comprising
   a base formed of a magnetic material,
   a first layer formed of a non-magnetic material which is disposed outside of said base in the radial direction, and
   a second layer formed of a non-magnetic material which has a friction coefficient smaller than that of said first layer and is disposed outside of said first layer in the radial direction.

2. The solenoid driving device according to claim 1, wherein said first layer is formed thicker than said second layer.

3. The solenoid driving device according to claim 1, wherein said first layer is formed by plating processing.

4. The solenoid driving device according to claim 1, wherein said second layer comprises of any one of fluororesin, molybdenum disulfide, and amorphous carbon.

5. A solenoid valve comprising:
   a coil disposed on a bobbin formed of a non-magnetic material;
   end portions formed of a magnetic material which are disposed adjacent to both ends of said coil;
   a yoke formed of a magnetic material which is disposed encompassing said coil and said end portions;
   a plunger disposed slidably in a hollow portion formed within said bobbin and end portions in the radial direction;
   a valve main unit integrally assembled with said yoke; and
   a spool disposed within said valve main unit, so as to be capable of advancing and retreating within said valve main unit, with one end in contact with said plunger;
   said plunger comprising
   a base formed of a magnetic material,
   a first layer formed of a non-magnetic material which is disposed outside of said base in the radial direction, and
   a second layer formed of a non-magnetic material which has a friction coefficient smaller than that of said first layer and is disposed outside of said first layer in the radial direction.

* * * * *